United States Patent
Dall

(10) Patent No.: US 9,461,820 B1
(45) Date of Patent: Oct. 4, 2016

(54) METHOD AND APPARATUS FOR PROVIDING A CONDITIONAL SINGLE SIGN ON

(71) Applicant: Teradici Corporation, Burnaby (CA)

(72) Inventor: William John Dall, New Westminster (CA)

(73) Assignee: Teradici Corporation, Burnaby, British Columbia (CA)

( * ) Notice: Subject to any disclaimer, the term of this patent is extended or adjusted under 35 U.S.C. 154(b) by 213 days.

(21) Appl. No.: 14/293,669

(22) Filed: Jun. 2, 2014

Related U.S. Application Data

(60) Provisional application No. 61/831,237, filed on Jun. 5, 2013.

(51) Int. Cl.
*H04L 9/08* (2006.01)
*H04L 29/06* (2006.01)

(52) U.S. Cl.
CPC ......... *H04L 9/0838* (2013.01); *H04L 63/0838* (2013.01)

(58) Field of Classification Search
None
See application file for complete search history.

(56) References Cited

U.S. PATENT DOCUMENTS

| | | | |
|---|---|---|---|
| 8,621,587 B2 | 12/2013 | Halls et al. | |
| 2006/0242415 A1* | 10/2006 | Gaylor | G06F 21/31 713/176 |
| 2007/0101440 A1* | 5/2007 | Bhatia | G06F 21/552 726/28 |
| 2007/0171921 A1* | 7/2007 | Wookey | G06F 3/1415 370/401 |
| 2007/0174410 A1 | 7/2007 | Croft et al. | |
| 2012/0084570 A1* | 4/2012 | Kuzin | G06F 21/41 713/182 |
| 2013/0166918 A1* | 6/2013 | Shahbazi | H04L 9/0863 713/183 |
| 2014/0331060 A1* | 11/2014 | Hayton | G06F 21/31 713/186 |

* cited by examiner

*Primary Examiner* — Kaveh Abrishamkar
(74) *Attorney, Agent, or Firm* — Moser Taboada

(57) ABSTRACT

A method and apparatus for accessing a computer resource, wherein, during a first access sequence, the computer resource receives credentials of a user from a device the user is using to access the computer resource, encrypts the credentials using at least a first credentials key stores the encrypted credentials, communicates the first credentials key to a connection broker or to the device, and purges the first credentials key. The computer resource, during a subsequent access sequence, receives the first credentials key, decrypts the encrypted credentials using the first credentials key, and purges the first credentials key. The computer resource authenticates the user using the credentials and purges the credentials after the user is authenticated and enables the device to access the computer resource following the authentication of the user.

14 Claims, 8 Drawing Sheets

METHOD AND APPARATUS FOR PROVIDING A CONDITIONAL SINGLE SIGN ON

CROSS-REFERENCE TO RELATED APPLICATIONS

This application claims benefit of U.S. Provisional Patent Application 61/831,237 entitled "Method for Tunneling Data Between Authentication Domains", filed Jun. 5, 2013, herein incorporated in its entirety by reference.

BACKGROUND OF THE INVENTION

1. Field of the Invention

Embodiments of the present invention relate generally to a method and apparatus for providing authentication between a device and computer resources.

2. Description of the Related Art

The rapid proliferation of cloud computing services has driven a need for users to first authenticate with a cloud service provider before gaining access to computing resources operated by the cloud service provider that themselves mandate submission of user credentials as part of an operating system login sequence. This requires repetitive login operations that are both inefficient and annoying to users. Authentication frameworks such as OAUTH provide 'valet' tokens that enable Internet service providers to provide customers with the conveniences of User ID, password and single sign on services that leverage security infrastructure of other well-established service providers such as Google or Amazon. However, no such frameworks are designed for resubmission of user credentials to computing resources for seamless sign-on while also addressing specific security concerns related to a service provider providing connection broker and computing services such as Desktop-as-a-Service (DaaS) or published application services that may be under directory management of a separate entity such as a corporate enterprise. Such security concerns arise when a connection broker is enabled to store or extract user credentials that might allow a rogue connection broker to be inserted in the authentication process. Additional security concerns arise if a computing resource, such as a remote desktop, is enabled to store unencrypted user credentials that expose the computing resource to password mining attacks.

Therefore, there is a need in the art for a secure method and apparatus for providing a single sign on for a computing resource.

SUMMARY OF THE INVENTION

Embodiments of the present invention generally relate to a method and apparatus for providing a conditional single sign on as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention comprise a method and apparatus that provides a single sign on for a computer resource without maintaining user credentials at a connection broker. In one embodiment, after initialization and key generation using a first access sequence, the method and apparatus provides a secure, key-based interaction between a device and a computing resource without exposing the user credentials to the connection broker. As such, during a first access sequence, the connection broker facilitates initialization of the secure interaction between the device and the resource, but any further authentication between the device and resource during a subsequent access sequence uses credential keys rather than the user credentials themselves. As a result, the device-resource interaction has enhanced security.

Figure 1:
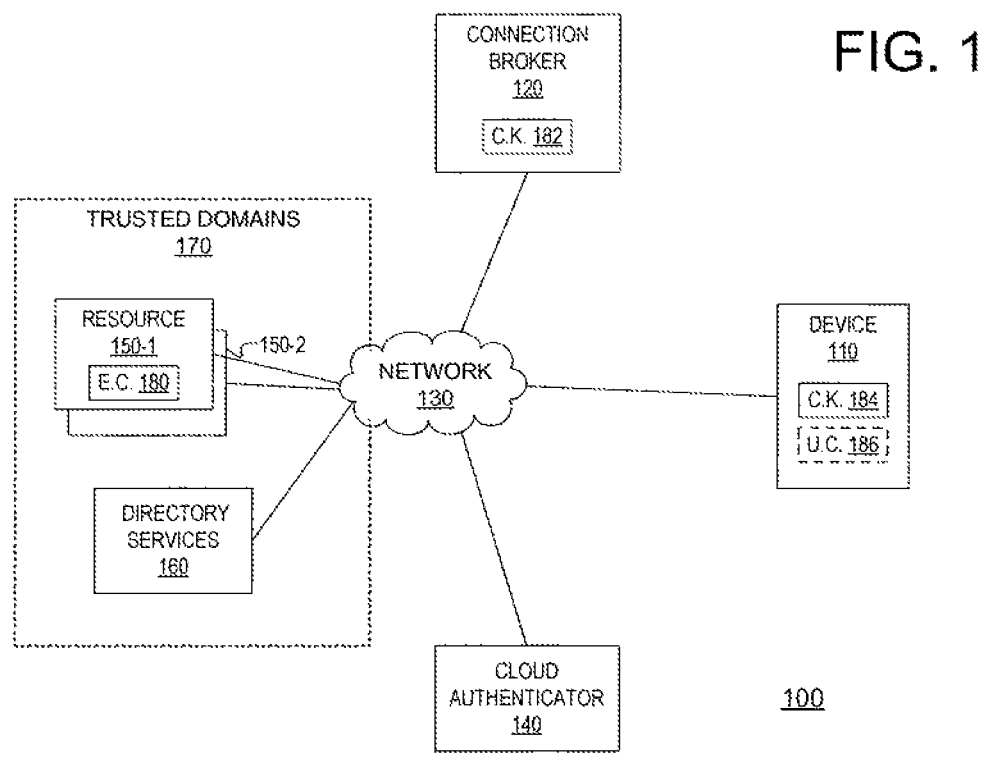
FIG. 1 illustrates selected details of an embodiment of a computer network comprising a service provider components, enterprise components, a cloud authenticator and a user-operated device.

FIG. 1 illustrates selected details of an embodiment of a computing system 100 ("system 100") comprising a device 110 coupled to a network 130 with multiple security domains, such as multiple security domains within an enterprise network or a network comprising an enterprise network coupled to the internet. A device 110 accesses a connection broker 120 as a pre-requisite for gaining access to a computing resource 150 such as a virtualized desktop. If the User ID presented by the device to the connection broker is associated with valid credentials key (C.K.) 182 previously received from the resource 150, the credentials key 182 is passed to the resource 150 in place of user credentials (U.C.) 186 from the device 110. Note that U.C. 186 is typically ephemeral in nature and not stored at device 110 following a log on process. The credentials key 182 is used to decrypt encrypted credentials (E.C.) 180, following which the user is granted access to the computing resource 150. In alternative embodiments, the device 110 stores credentials key 184 (a second credentials key) received from the computing resource 150 in addition to or as an alternative to credentials key 182. The second credentials key 184 is used to provide an extra layer of security for decrypting encrypted credentials 180 and/or as an alternative to credential keys 182 for decrypting encrypted credentials 180. Besides the limited single sign on (SSO) benefits, such an approach provides improved security by ensuring user credentials from the device 110 to the resource 150 never pass through the broker 120 and further alleviates requirements for credentials and keys to both be stored at the resource 150.

Figure 4:
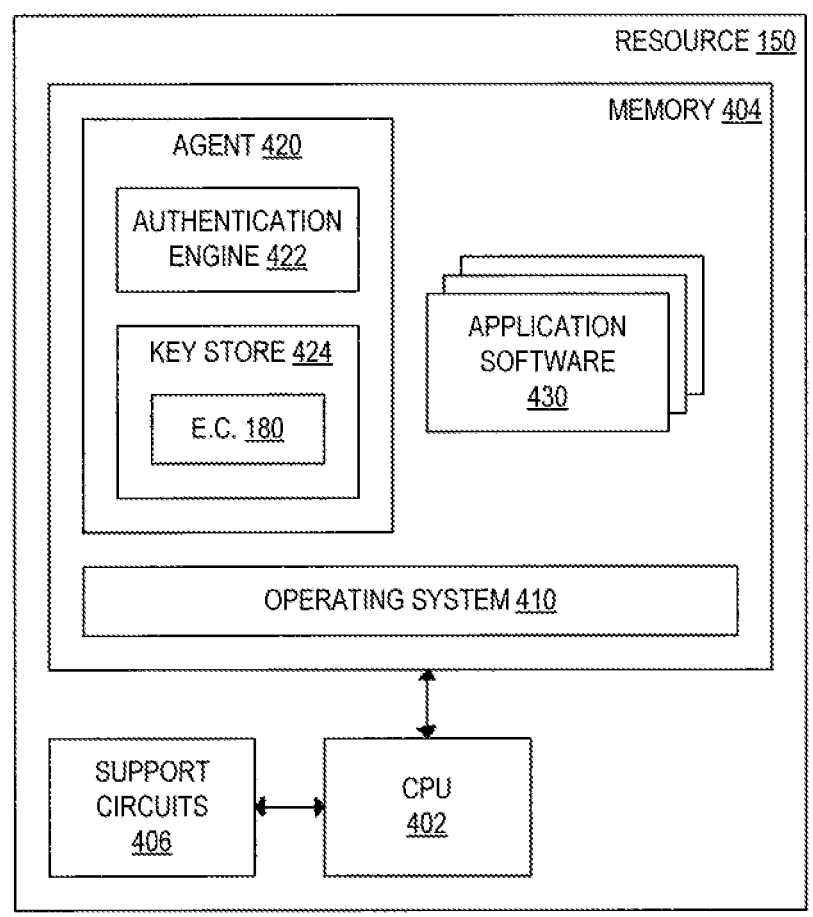
FIG. 4 illustrates an embodiment of a computing resource with authentication services.

In an embodiment, the device 110 comprises any computer such as a server, a workstation, laptop, tablet, smartphone, thin client or zero client computers that desires to communicate with one or more resources 150 in a more secure manner. The resource 150 (shown as a resource 150-1 and a resource 150-2), an embodiment of which is shown in FIG. 4, may be virtualized remote desktops (such as WINDOWS or LINUX desktops) maintained using Virtual Desktop Infrastructure (VDI), remote workstations or Desktop-as-a-Service (DaaS) platforms from service providers or published applications available on any of a variety of operating systems including those maintained using Remote Desktop Session Host (RDSH) infrastructure available from service providers such as VMWARE, CITRIX. MICROSOFT or AMAZON and/or operating on servers managed within an enterprise. In some embodiments, the resources 150 include a proxy service such as a security gateway that provides address translation between network 130 and computing resources within the trust domain 170. The resources 150 are in the trust domain 170; the user authentication thereof is managed by the directory services 160 such as ACTIVE DIRECTORY from MICROSOFT Corporation.

A user via use of the device 110 accesses a DaaS or RHSH service provider (not shown) typically via a web page, following which the service provider uses cloud authenticator 140 to authenticate the user. In an embodiment, the cloud authenticator 140 is an authentication service that uses a well-known authentication framework such as OAUTH2 or OpenID. In other embodiments, the cloud authenticator 140 is a proprietary authentication service provided by the service provider. In some embodiments, the directory services 160 may be integrated with or an extension of the cloud authenticator 140, for example using Active Directory Federation Services (AFDS), in which case user credentials presented at the resource 150 are authenticated by the cloud authenticator 140 using a protocol such as Security Assertion Markup Language (SAML).

Figure 3:
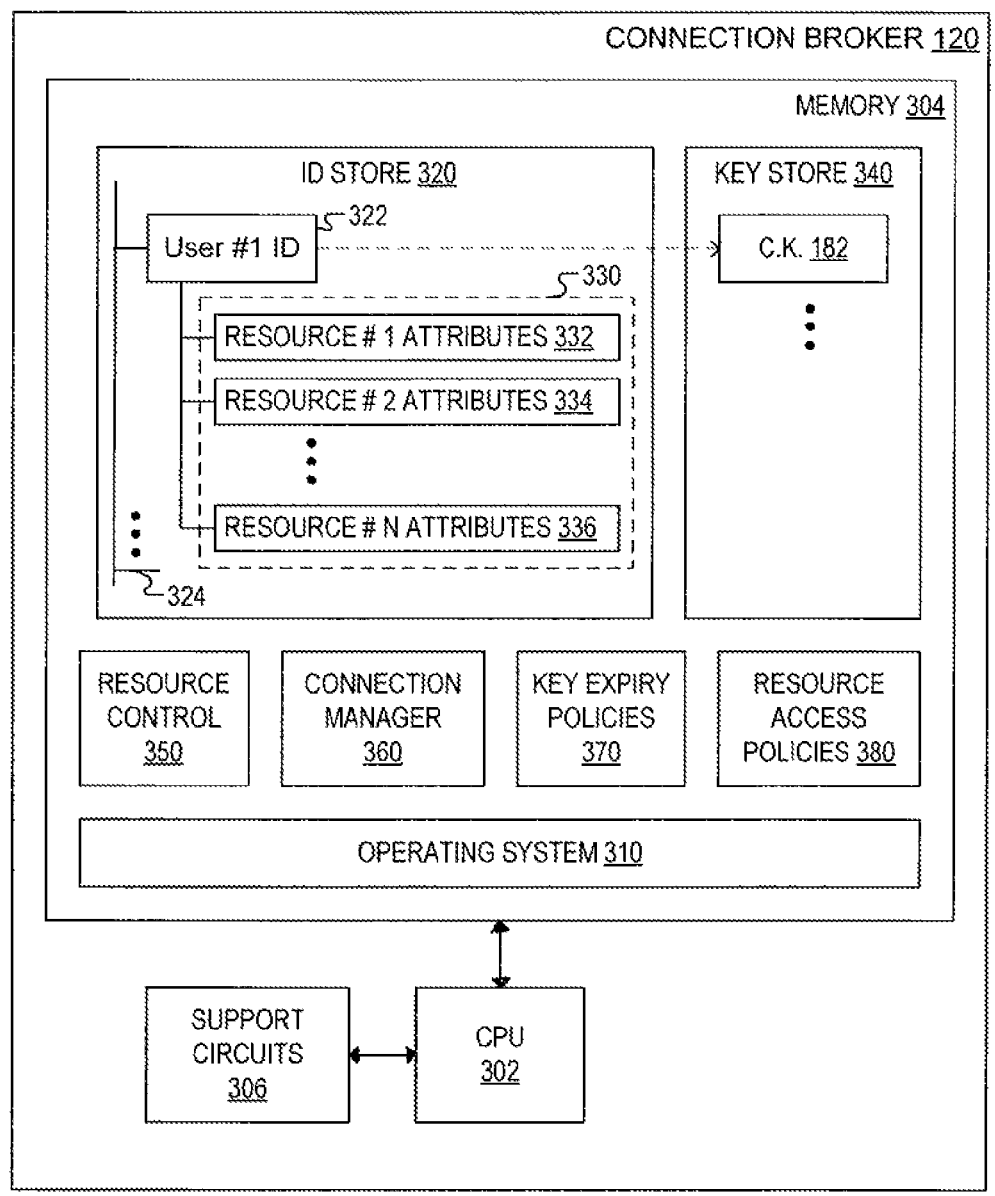
FIG. 3 illustrates an embodiment of a connection broker.

Once the user credentials presented by the device have been authenticated, the service provider engages the connection broker 140 (i.e., 'broker' 140) that, in one embodiment, comprises server and application software that presents to the device a list of resources 150 accessible to the user, typically defined by policies surrounding the user identity. An embodiment of the broker 120 is illustrated in FIG. 3. In other embodiments, the device may be redirected to the broker 120 or initially connect to the connection broker with a token (e.g., a 'valet key') previously received from the cloud authenticator 140.

Figure 2:
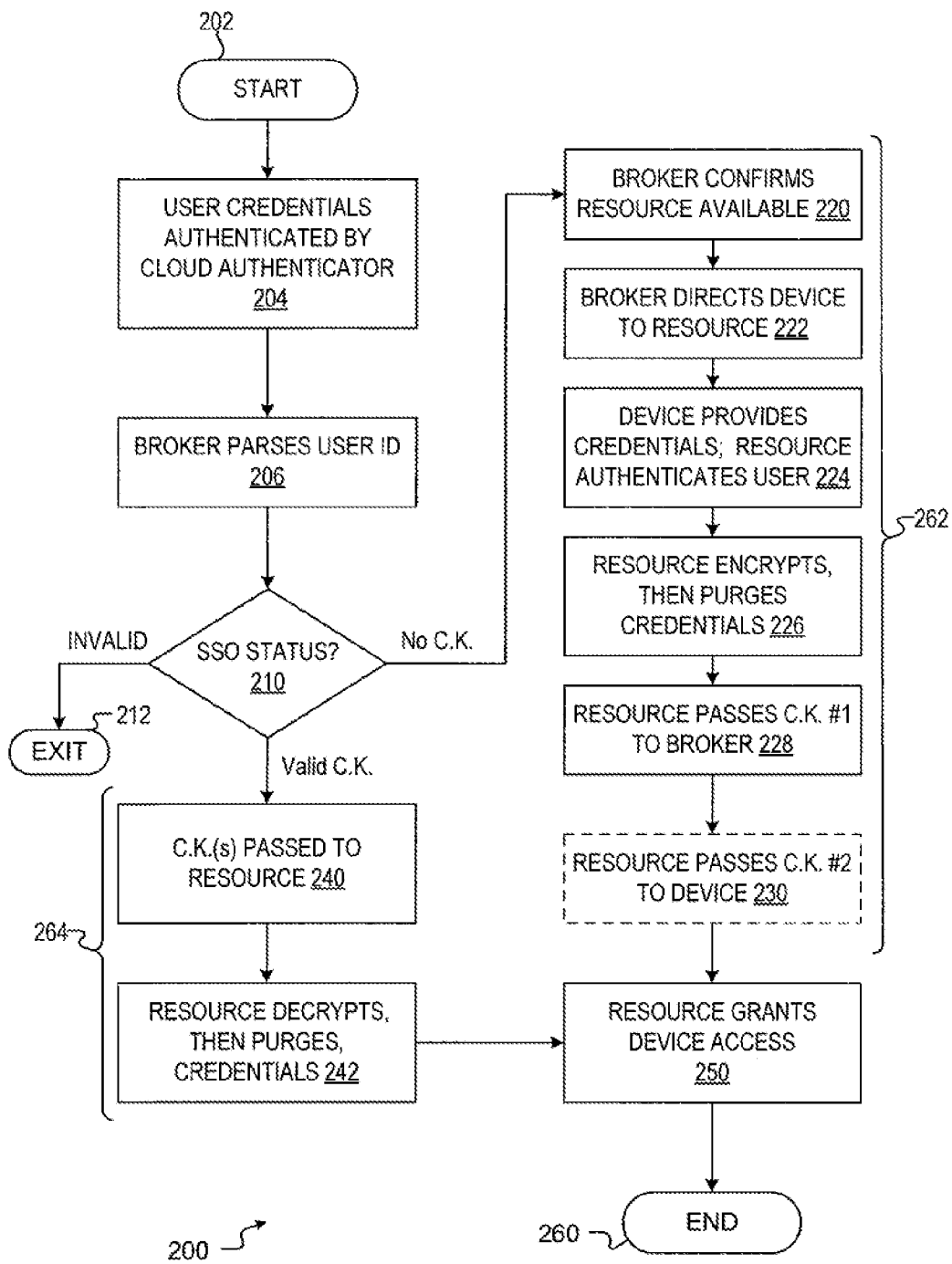
FIG. 2 illustrates a limited single sign-on authentication method.

FIG. 2 illustrates a conditional single sign-on authentication method 200 as performed, in one embodiment, using the system 100 of FIG. 1. The method 200 starts at step 202 and proceeds to step 204 in which user credentials presented by device 110 are authenticated by cloud authenticator 204. In an embodiment, the device submits a User ID in User Principal Name (UPN) format as interpreted by WINDOWS Active Directory (A.D.) but alternative formats for User ID may be used in different embodiments. In an implementation that utilizes a Framework such as OAUTH2 for SSO, the cloud authenticator 140 returns a time-limited token (i.e., a 'valet key') for the device to assert user identity to other servers.

Following successful authentication at step 204, the method 200 proceeds to step 206 in which the User ID is presented to the broker 120. In different embodiments, i) the User ID is passed from the cloud authenticator 140 to connection broker 120 or ii) the device 110 passes the User ID directly to connection broker 120 following acknowledged authentication by the cloud authenticator 140 or iii) the User ID is initially passed by the device 110 to the connection broker 120 which redirects the device 110 to the cloud authenticator 140 for authentication. The broker 120 parses the User ID to determine if a valid credentials key 182, previously received from resource 150, is available for the user. The credentials key 182 may expire following a pre-determined number of SSO operations (e.g., 10 or 50 operations) or after a pre-determined time following issuance (e.g., one month expiry). Furthermore, the availability of the credentials key 182 may be based on additional requirements beyond User ID. Such requirements include device identity, device network location (e.g., IP address) or device location information such as provided by Global Positioning System (GPS) facilities of the device, thereby limiting the scope of SSO to a particular device or location.

If, at step 210, the method 200 determines that the User ID is invalid, the method 200 exits at 212.

If, at step 210, the method 200 determines that no credentials key 182 is available for the User ID, e.g., first time access, expired key, blocked location, blocked device type or the like, the method 200 proceeds to step 220. The steps 220, 222, 224, 226, 228 and 230 represent a first access sequence 262. These steps are only utilized when the device 110 requests access to the resource for the first time or following the expiry of encrypted credentials 180 and/or associated credential keys 182. All subsequent access requests are processed using steps 240 and 242 that represent a subsequent access sequence 264.

At step 220, the broker 120 confirms the resource 150 selected by the user is available. In an embodiment, the broker 120 initiates instantiation, initialization, configuration and/or preparation of the resource as might be required for an authorized user to access the resource.

At step 222, the broker 120 directs the device to the resource 150 (or a suitably provisioned proxy of the resource), for example, by providing device 110 with address information (e.g., IP address) and a secure link (e.g., Secure Socket Layer (SSL)) is established between the device 110 and the resource 150.

At step 224, the device presents full sign-on credentials (e.g., User ID and password), for example in response to a WINDOWS login screen presented by resource 150. The resource 150 authenticates the full sign-on credentials using directory services 160. In some embodiments, the device 110 generates and stores a non-reversible Secure Hash Algorithm (SHA) code such as an SHA-256 code of the password used as additional tokens for subsequent SSO sequences. A more secure approach comprises the resource 150 communicating a salt value to the device 110 for the derivation of the non-reversible hash code derived from the password which ensures the hash code cannot be used extensively. In some embodiments in which the device 110 comprises a web browser for accessing the cloud authenticator 140, the device 110 may not have access to the password in which case the cloud authenticator 140 generates the hashed password and stores it at the broker 120.

Following successful device authentication at step 224, the method 200 proceeds to step 226 in which the resource 150 encrypts the credentials received at step 224. The credentials are encrypted using any one or more combinations of several available techniques and the encryption key sent to the broker 120 as a first credentials key 182. For example, in an embodiment, the resource 150 generates a symmetric key such as an Advanced Encryption Standard (AES) key and the key is used to encrypt a string comprising at least the User ID and password. A stronger encryption includes a salt value prepended to the string. In another embodiment, the resource 150 also generates a second symmetric key and the string, encrypted by the first key, is further encrypted by the second symmetric key. In another embodiment, the string is further encrypted using an encryption method wherein at least part of the encryption key comprises a non-reversible hash code derived from the password itself. Consequently, the device 110 may submit hashed rather than clear text credentials to the resource 150 in subsequent accesses. In some such embodiments, the encryption key comprises a hash of a plurality of values including first and/or second symmetric keys, salt value and hash code derived from the password. In another embodiment, one or more other public keys available to the resource 150 are used in conjunction with one or more of the encryption steps described. In some embodiments, the resource 150 stores one or more additional authentication codes of the credentials key 182 and/or credentials key 184 (e.g., a Hash-based Message Authentication Code (HMAC) such as HMAC-SHA-256 or comparable authentication codes) to validate that keys received from the broker 120 and/or the device 110 have not been tampered.

The resource 150 locally stores the encrypted string and additional authentication codes as encrypted credentials 180. The resource 150 then purges the unencrypted credentials. In cases where a pool of resources 150 requires access to the same credentials, the credentials encrypted at step 226 are stored at a location such as a credentials 'vault' in the trusted domain 170 accessible to all resources in the pool. Unauthorized access to such encrypted credentials may be prevented using any of several techniques such as limiting which resources have file share access, or by further encrypting the credentials with another credentials key that is only distributed to resources in the authorized pool.

At step 228, the first credentials key used in step 226 is passed from the resource 150 to the broker 120 and stored as credentials key 182.

At step 230, the resource 150 passes the optional second credentials key used at step 226 to the device 110. The device 110 stores the second credentials key as credentials key 184.

If, at step 224, the user credentials presented by the device 110 is successfully authenticated, the method 200 proceeds to step 250 in which the resource 150 grants access to the device.

If, at step 210, the method 200 determines that valid credentials key 182 is already available for the User ID, the device 110 receives the credential key 182 from the connection broker 150 and passes the credentials to the resource 150 at step 240. In an alternative embodiment, the connection broker 120 passes the credential key 182 directly to the resource 150. In embodiments that support a plurality of credentials keys and/or additional authentication codes, additional keys such as credentials keys 184 and/or non-reversible hashed password codes are sent to the resource 150 from the device 110 and/or the broker 120.

At step 242, the resource 150 uses credentials key 182 and, in some embodiments, additional keys and/or authentication codes as described to decrypt the encrypted credentials 180. Once the directory services 160 validates the credentials, the decrypted credentials are purged (i.e., destroyed in a secure manner) and the method 200 proceeds to step 250 in which the resource 150 grants access to the user.

The method 200 ends at step 260.

FIG. 3 illustrates an embodiment of a connection broker 120. The connection broker 120 may comprise multiple servers in a common security domain, each enabled to perform any one or more of the connection management, resource control, key storage and ID storage functions of the broker 120.

In one embodiment, the connection broker 120 comprises at least one central processing unit (CPU) 302, a memory 304 and support circuits 306. The CPU 302 may comprise one or more microprocessors, microcontrollers, application specific integrated circuits and/or the like. The memory may be any form of digital storage device or devices used for storing digital data and executable software. The support circuits 306 comprise one or more circuits that are commonly used to support the functionality of the CPU 302, such as, clock circuits, cache, power supply circuits, busses, input/output circuits and the like. The memory 304 comprises an identity (ID) store 320, a key store 340, a resource control 350, a connection manager 360, key expiry policies 370, resource access policies 380, and an operating system 310. The operation of each module and their interactions are described in detail below.

The identity store 320 comprises a memory facility enabled to store a list of User IDs and resource associations. For example, User '#1' ID 322 is associated with a set of resources 330 comprising a first resource (e.g., resource 150-1) with attributes 332, a second resource (e.g., resource 150-2) with attributes 334 and additional resources if assigned such as a third resource with attributes 336. In an embodiment, each set of resource attributes store connection and status information such as address and resource initialization state for the associated resource. Similarly, User '#2' ID 324 is associated with a separate set of resources.

The key store 330, which may share the server and operating system 310 or may use a separate server in the trust domain of system 310, comprises a memory facility enabled to store a list of credential keys including key 182 associated with User #1 ID 322. In a variation that enables different user IDs for cloud authentication and resource authentication, ID store 320 provides a map of associations between user IDs required for authentication with the cloud authenticator 140 corresponding user IDs required for authentication with the directory services 160. In another variation that enables segmentation of resources, each User ID 322 may be associated with a plurality of credential keys and each credential key is mapped to a specific pool of resources 150 available to the user thereby enabling single sign on characteristics (e.g., number of login attempts) to be segmented according to resource pool. In some embodiments, the key store 340 stores one or more additional authentication codes (such as an HMAC-SHA-256 authentication code) associated with the credentials key 182 that is passed to resource 150 at sign-on.

The memory 304 stores executable software of the broker 120. The software comprises the resource control 350, the connection manager 360, key expiry policies 370, resource access policies 380, and the operating system 310. The CPU 302 executes the resource control 350 to initialize and configure resources 150 and executes the connection manager 360 to provide the device 110 with connection information. The CPU 302 uses the key expiry policies 370 to execute the expiry rules of step 206 of method 200 and resource access policies 380 to filter the availability of credential keys and/or advertised available resources based on additional defined attributes such as device location, device type or device identity. The CPU 302 executes the operating system 310 to support functionality of the connection broker 120 and its software modules to facilitate implementation of portions of the method 200 of FIG. 2 that are performed by the connection broker 120.

FIG. 4 illustrates an embodiment of a computing resource 150 comprising at least one central processing unit (CPU) 402, a memory 404 and support circuits 406. The CPU 402 may comprise one or more microprocessors, microcontrollers, application specific integrated circuits and/or the like. The memory may be any form of digital storage device or devices used for storing digital data and executable software. The support circuits 406 comprise one or more circuits that are commonly used to support the functionality of the CPU 402, such as, clock circuits, cache, power supply circuits, busses, input/output circuits and the like. The memory 404 comprises an agent 420, application software 430 and an operating system 410. In an embodiment, the CPU 402 and operating system 410 form well-known server hardware that can be used for cloud or enterprise virtualization infrastructure. The operating system 410 may be a conventional operating system such as a WINDOWS or LINUX variant. The CPU 402 executes the application software 430 to facilitate functionality of the resource 150.

The CPU 402 executes the agent 420 to provide user authentication functions to the resource 150 as described with respect to the method 200 of FIG. 2. The agent 420 comprises authentication engine 422 enabled with encryption services, a service for deleting credentials and expiring encrypted credentials 180, and communication services for communicating with the device 110 and the broker 120. Generally the policies for expiration of encrypted credentials and credential keys are synchronized for simultaneous expiry. The key store 424 comprises a memory structure for storing the encrypted credentials 180 and optionally additional authentication codes used in select embodiments.

Figure 5:
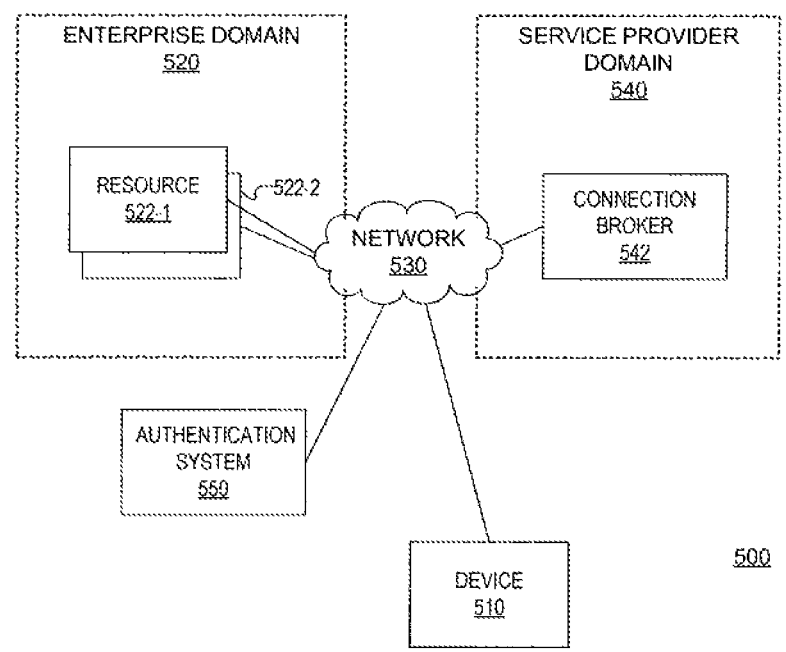
FIG. 5 illustrates selected details of an embodiment of a computer network comprising enterprise and service provider domains.

FIG. 5 illustrates selected details of an embodiment of an enterprise computer system 500 comprising a computer network 530 interconnecting an enterprise domain 530 and a service provider domain 540. The network 530 also connects an authentication system 550 and a device 510 (user device) to the domains 520 and 540. The enterprise domain 520 comprises at least one resource 522 (shown as a resource 522-1 and a resource 522-2).

The resources 522 comprise one or more computers such as a server, virtualized desktop or any other computing resource including published applications enabled for secure communications with the device 510. In an embodiment, the connection broker 542 is a connection management server that is trusted to create or instantiate or manage or identify the target resource 522 (e.g., create virtual machines), but the broker 542 is not trusted to maintain credential information such as corporate credentials (e.g., passwords) for a set of users. Rather, such corporate credentials are maintained by an authentication system 550 (e.g., an Active Directory Federated Service (ADFS)). The authentication system 550 communicates with the connection broker 542 using Security Assertion Markup Language (SAML), OAUTH variants or the like. The connection broker 542 is generally hosted on a third party network such as a service provider network in domain 540. The device 510 is a computer such as a PC, workstation, thin client, zero client, laptop or tablet enabled with software and/or firmware to connect to the connection broker 542 and the resources 522.

Figure 6:
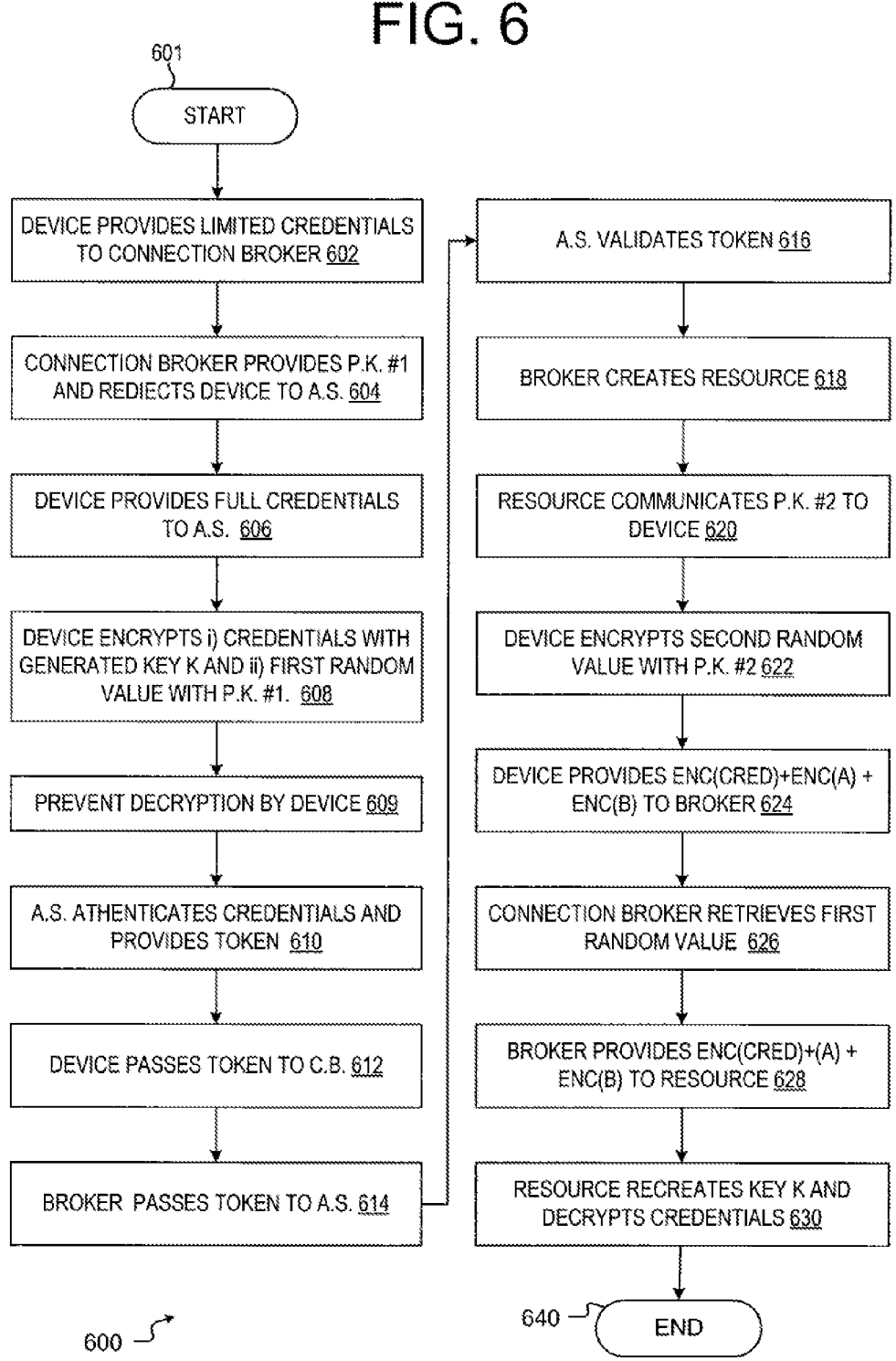
FIG. 6 illustrates a method for tunneling authentication between enterprise and service provider domains.

FIG. 6 illustrates a method 600 for tunneling secure data between the two domains 520 and 540 of FIG. 5. The method 600 ensures that the secure data can be stored securely on the device 510 during the time period in which a resource 522 is being prepared. The method 600 starts at step 601 and proceeds to step 602. At step 602, the device 510 initiates a request to start authenticated communications with the resource 522 by providing limited credentials such as User ID and domain identification to the connection broker 542.

At step 604, the broker 542 provides the device 510 with a public encryption key #1 and redirects the device 510 to authenticate with the authentication system 550. In an alternative embodiment, the broker 542 provides the device 510 with a first random value A as an alternative to a public encryption key.

At step 606, the device provides full user credentials (e.g., User ID and password) to the authentication system 550.

At step 608, the device 510 encrypts the credentials and a random value A. In an embodiment, the sequence as described by process 800 is used to encrypt credentials and a random value A with an encryption KEY K. The random value A is also encrypted with a public encryption key #1 provided by broker 542 at step 604.

In an alternative embodiment of step 608, the device 510 encrypts the credentials using KEY K with second random value generated by the device 510 and the first random value A received from the broker 542.

At step 609, the device securely purges (i.e., deletes) the unencrypted credentials and the KEY K to prevent decryption of the credentials at or by the device 510. The device 510 also deletes random value A in a secure manner. Following the deletion of A and KEY K, device 510 is no longer enabled to decrypt the credentials.

At step 610, if the device is authenticated (i.e., a valid password for the user has been provided), the authentication system 550 provides the device 510 with a token (e.g., a limited use certificate).

At step 612, the device 510 provides the token received at step 610 to the broker 542.

At step 614, the broker 542 authenticates the user by passing the token to authentication system 550. The disclosed method comprises exchanging the token with the authentication system, but alternative user authentication methods might be used in alternative embodiments.

At step 616, the authentication system 550 validates the token and confirms to the broker 542 the validity of the token.

On confirmation of the valid token, the broker 542 instantiates (e.g., identifies or initializes) the resource 522 at step 618. In some embodiments, the resource 522 may pre-exist from an earlier session.

Once the resource 522 is ready, the resource provides the device 510 with a public encryption key #2 at step 620. Note that in some embodiments, the 'public encryption key #2' comprises a certificate signed by the authentication system 550 (e.g., ADFS service), to prevent a rogue 'broker' from being able to spoof the encryption key #2. The method 600 as depicted assumes that a broker is not spoofing the public encryption key #2.

At step 622, the device 510 encrypts the second random value B with public encryption key #2 and optionally deletes B in a secure manner.

At step 624, the device 510 provides the broker 542 with ENC(Credentials)+ENC(A)+ENC(B); wherein
   a) ENC(Credentials) denotes encryption of credentials using KEY K
   b) ENC(A) denotes encryption of first random value A using public key #1
   c) ENC(B) denotes encryption of second random value B using public key #2

At step 626, the broker 542 decrypts ENC(A) to retrieve the first random value A.

At step 628, the broker 542 communicates ENC(Credentials), decrypted random value A and ENC(B) to the resource 522.

At step 630 the resource 522 recreates KEY K and decrypts the credentials using the following sequence:
a) retrieves second random value B by decrypting ENC (B) using private key #2 held by the resource
b) Creates the KEY K=F(A, B)
c) Decrypts the credentials using KEY K.

The method 600 ends at step 640.

Several variations to the method 600 are used in alternative embodiments. In one such variation, a user of the device 510 is allocated multiple resources such as a first resource 522-1 and a second resource 522-2. For example, the resources may be a second virtualized desktop and/or additional resources including servers, applications or the like which may become available at different times (e.g., 10 minutes apart). In such instances, the device 510 stores a second random value B and encoded credentials (i.e., ENC (Credentials)) and proceeds to re-encrypt B with a new public encryption #3 issued by the second resource 522-2 (and so on for additional resources).

In another variation, the KEY K comprises a combination of random values (e.g., KEY K=concatenation of A and B) or a high entropy combination of three or more random values (e.g., KEY K=A XOR B XOR C), where C is used to extend the tunneling mechanism or KEY K generated using a secure hash algorithm.

In another variation, resource 522-1 establishes communication with the device 510 and receives the ENC(Credentials) and ENC(B) directly from the device.

In another variation, other key exchange methods are used, e.g., establishing a secure communication channel and communicating a symmetric encryption key.

Figure 7:
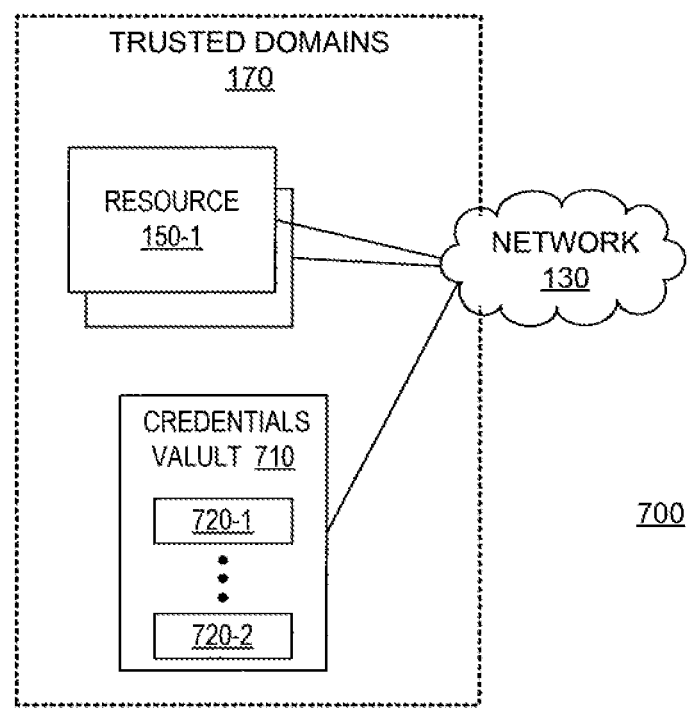
FIG. 7 illustrates a computer network comprising a credentials vault.

FIG. 7 illustrates system 700 comprising an embodiment of the trusted domain 170 with a credentials vault 710 accessible to the computing resources 150. The credentials vault 710 stores encrypted credentials 720 (shown as encrypted credentials 720-1 and encrypted credentials 720-2) generated at step 226 of the method 200 of FIG. 2. In an embodiment, the encrypted credentials 720-1 are associated with a user assigned to the resource 150-1 and the encrypted credentials 720-2 are associated with a user assigned to the resource 150-2. In other embodiments, users may be authorized to access a plurality of resources and/or resources may be accessible to multiple users. In such embodiments, each resource (e.g., resource 150-1) stores a unique encrypted credentials value in the vault 710 for each and each authorized user.

Figure 8:
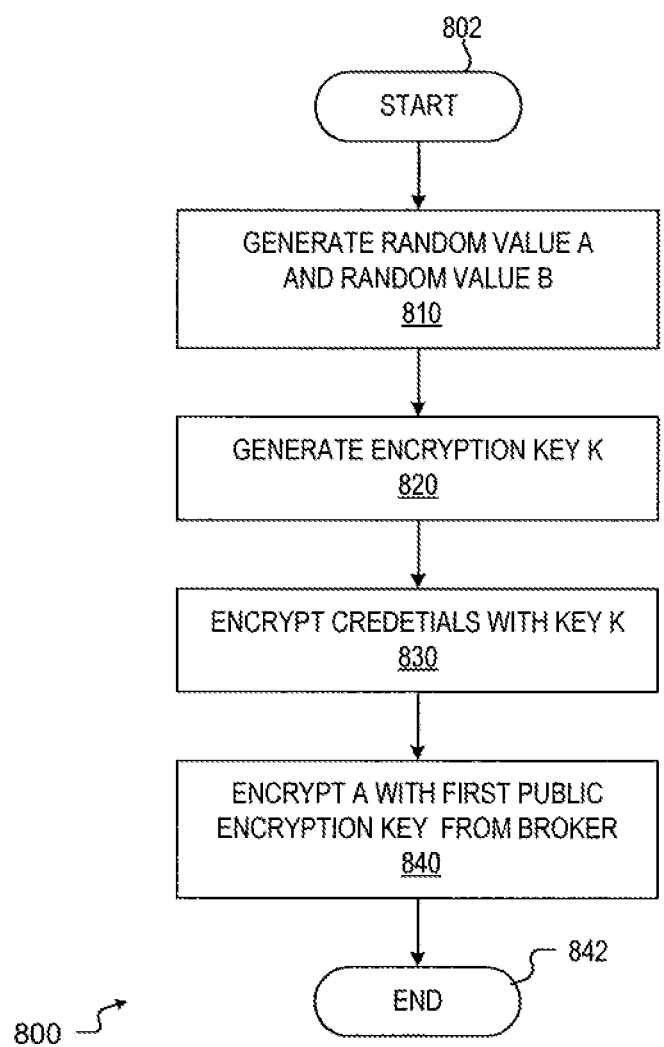
FIG. 8 illustrates a process used to encrypt credentials.

FIG. 8 illustrates a method 800 used to encrypt credentials. The method 800 starts at step 802 and proceeds to step 810 in which two random values 'random value A' and 'random value B' are generated.

At step 820, an encryption KEY K is generated in which KEY K=F(random value A, random value B). The function F( ) combines random value A AND random value B; preserving high entropy. Examples of F(random value A, random value B) include the XOR function or alternative suitable high performance hashing process. At step 830, the device 510 encrypts the credentials with KEY K generated at step 820. At step 840, the device 510 encrypts the random value A with a public encryption key #1 provided by the broker 542 at step 604. The method 800 ends at step 842.

While the foregoing is directed to embodiments of the present invention, other and further embodiments of the invention may be devised without departing from the basic scope thereof, and the scope thereof is determined by the claims that follow.

The invention claimed is:

1. A computer implemented method for accessing a computer resource comprising:
during a first access sequence:
receiving, at the computer resource, credentials of a user from a device the user is using to access the computer resource, wherein the credentials from the device have bypassed a connection broker;
encrypting the credentials using at least a first credentials key;
storing the encrypted credentials;
communicating the first credentials key to the connection broker for storage;
further encrypting the credentials using a second credentials key and communicating the second credentials key to the device; and
purging, by the computer resource, the first and second credentials keys; and
during a subsequent access sequence:
receiving, at the computer resource, the first credentials key from the connection broker and the second credentials key from the device;
decrypting the encrypted credentials using the first and second credentials keys;
purging at least the first and second credentials keys;
authenticating, by the computer resource, the user using the credentials and purging the credentials after the user is authenticated; and
enabling the device to access the computer resource following the authentication of the user.

2. The method of claim 1 wherein the user is validated at the connection broker against a valet key before either the first or second access sequences are performed.

3. The method of claim 1 wherein the first credentials key is received from the connection broker if the device matches a one of a specified device location or a specified network address.

4. The method of claim 1 wherein the first credentials key received during the subsequent access sequence is accompanied by a non-reversible hash code.

5. The method of claim 4 wherein the non-reversible hash code comprises a hash-based message authentication code for a password of the user.

6. The method of claim 5 wherein the non-reversible hash code is salted by a value provided by the computer resource.

7. The method of claim 4 further comprising computing the non-reversible hash code using a cloud authenticator and storing the non-reversible hash code at the connection broker.

8. The method of claim 1 further comprising storing the encrypted credentials in a location accessible to additional computer resources in a trust domain of the computer resource.

9. The method of claim 8 further comprising further encrypting the encrypted credentials in the location using a third credentials key maintained by the computer resource and the additional computer resources in the trust domain.

10. The method of claim 1 further comprising generating an authentication code associated with the first credentials key during the first access sequence and confirming validity of the first credentials key against the authentication code in the subsequent access sequence.

11. A non-transitory computer readable medium for storing software that, when executed by a processor, causes the processor to perform a method for accessing a computer resource comprising:
- during a first access sequence:
  - receiving credentials of a user from a device the user is using to access the computer resource, wherein the credentials from the device have bypassed a connection broker;
  - encrypting the credentials using at least a first credentials key;
  - storing the encrypted credentials;
  - communicating the first credentials key to the connection broker for storage;
  - further encrypting the credentials using a second credentials key and communicating the second credentials key to the device; and
  - purging, by the computer resource, the first and second credentials keys; and
- during a subsequent access sequence:
  - receiving, at the computer resource, the first credentials key from the connection broker and the second credentials key from the device;
  - decrypting the encrypted credentials using the first and second credentials keys; and
  - purging at least the first and second credentials keys;
  - authenticating, by the computer resource, the user using the credentials and purging the credentials after the user is authenticated; and
  - enabling the device to access the computer resource following the authentication of the user.

12. Apparatus for accessing a computer resource comprising:
- a computer resource for supplying computing services to at least one device being operated by a user;
- a connection broker, coupled to the computer resource via a network, for confirming computer resource availability to the at least one device;
- wherein during a first access sequence the computer resource:
  - receives credentials of a user from a device the user is using to access the computer resource, wherein the credentials from the device have bypassed the connection broker;
  - encrypts the credentials using at least a first credentials key;
  - stores the encrypted credentials;
  - communicates the first credentials key to the connection broker for storage;
  - further encrypting the credentials using a second credentials key and communicating the second credentials key to the device; and
  - purges, by the computer resource, the first and second credentials keys; and
- during a subsequent access sequence:
  - receives the first credentials key from the connection broker and the second credentials key from the device;
  - decrypts the encrypted credentials using the first and second credentials keys; and
  - purges at least the first and second credentials keys; and
- the computer resource authenticates the user using the credentials and purges the credentials after the user is authenticated; and enables the device to access the computer resource following the authentication of the user.

13. The apparatus of claim 12 wherein the user is validated at the connection broker against a valet key before either the first or second access sequences are performed.

14. The apparatus of claim 13 further comprising a cloud authenticator for generating the valet key.

* * * * *